April 5, 1955                E. L. HAHN                2,705,790
SPIN ECHO TECHNIQUE AND APPARATUS
Filed Jan. 18, 1954                                                2 Sheets-Sheet 1
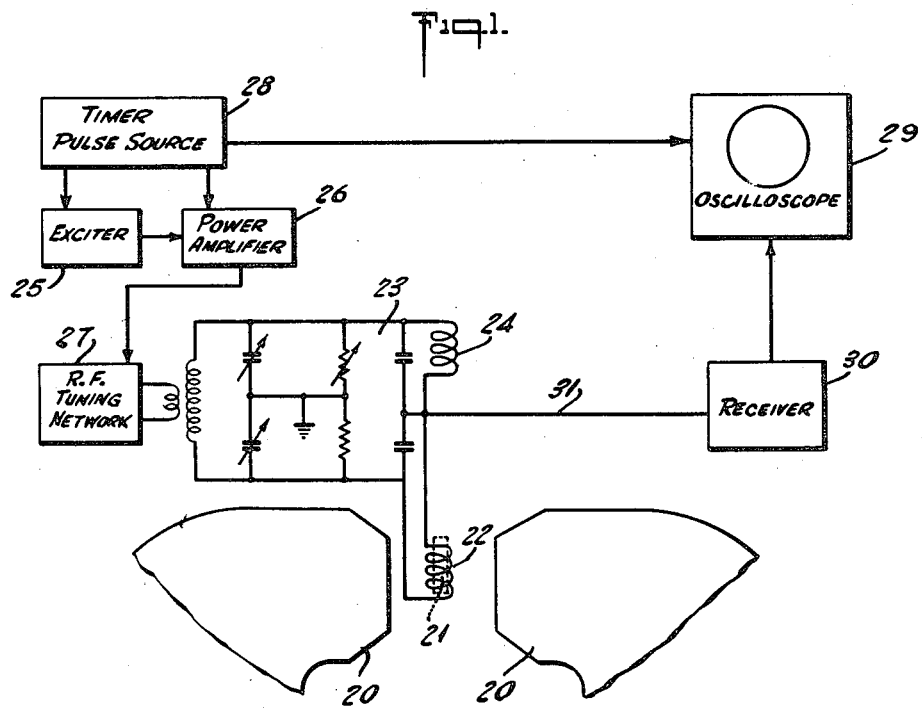
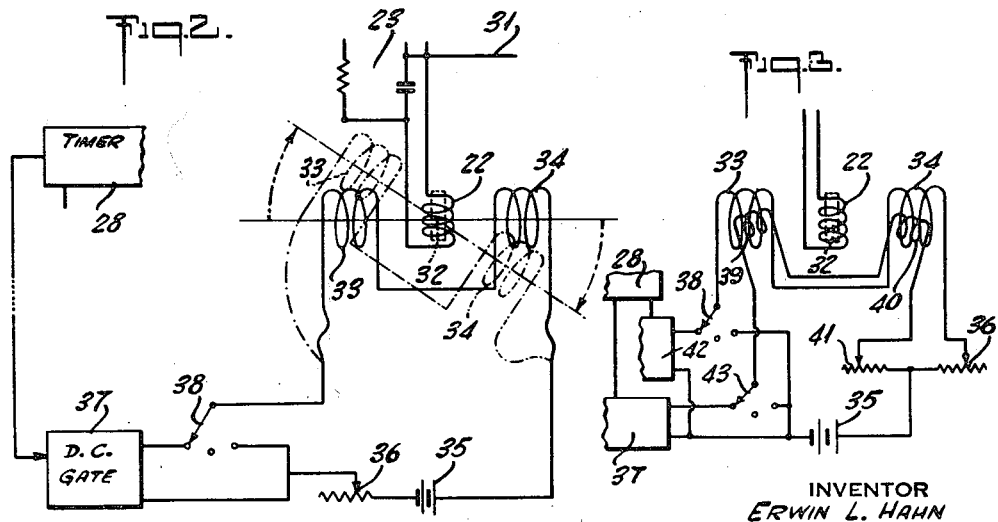
INVENTOR
ERWIN L. HAHN
BY
Van Deventer & Shively
ATTORNEYS April 5, 1955
E. L. HAHN
2,705,790
SPIN ECHO TECHNIQUE AND APPARATUS
Filed Jan. 18, 1954
2 Sheets-Sheet 2
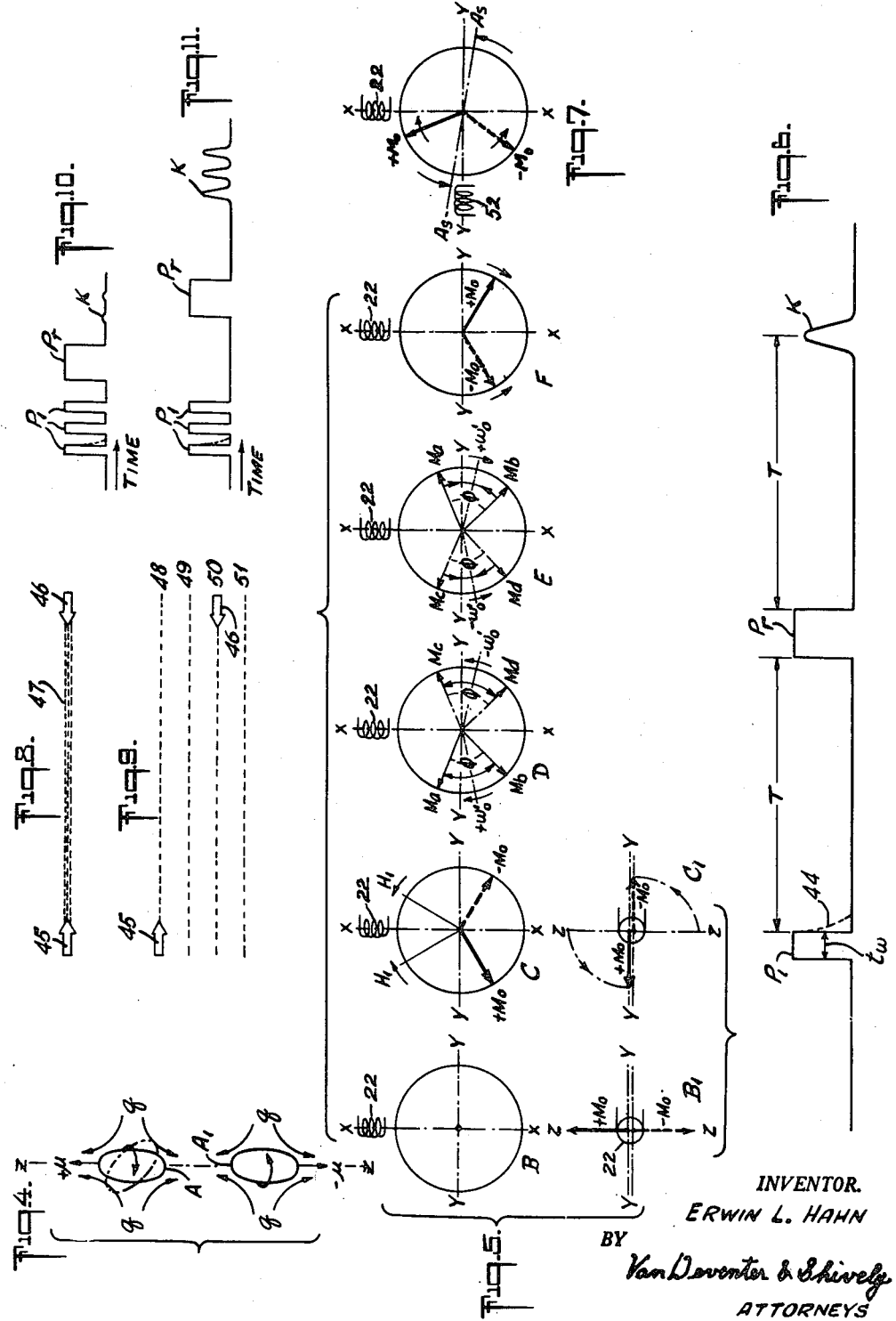
INVENTOR.
ERWIN L. HAHN
BY
Van Deventer & Shively
ATTORNEYS United States Patent Office 2,705,790
Patented Apr. 5, 1955

2,705,790

SPIN ECHO TECHNIQUE AND APPARATUS

Erwin L. Hahn, Bergenfield, N. J., assignor to International Business Machines Corporation, a corporation of New York Application January 18, 1954, Serial No. 404,559

15 Claims. (Cl. 340—173)

The present invention pertains to improvements in gyromagnetic resonance technique and apparatus, having particular application to the production of free precession of an ensemble of gyromagnetic resonators in crystalline materials, and the advantageous utilization of this phenomenon for storing and subsequent recovery of information through a process known as spin echo technique.

In order to set forth most clearly the value and scope of the improvements attained by the present invention, it is necessary first to outline the nature of spin echo technique as hitherto practiced. The basis of this technique is explained in mathematical detail in my article entitled "Spin echoes," published in Physical Review, November 15, 1950, and in simplified form in my further article "Free nuclear induction" published in Physics Today, November 1953. Since the above articles are readily available in the public domain, it is appropriate that the present recapitulation be limited substantially to those aspects in which the improvements set forth herein comprise a new and useful advance in the art.

It has previously been determined that atomic nuclei of chemical substances have gyroscopic moments $Ih$ due to their characteristic spin, and also magnetic moments $\mu$ orientated along their gyroscopic axes. The ratio $\gamma$ between these two moments, that is $$\gamma = \frac{\mu}{Ih}$$

is known as the gyromagnetic ratio and is a constant for any given type of nucleus. A detailed discussion of the above nuclear characteristics, particularly as applied to chemical analysis, is set forth in Patent #2,561,489 to F. Bloch et al. Spin echo technique, on the other hand, is based on utilizing the application of exterior magnetic influences to such gyromagnetic bodies for storing information in a sample of chemical substance, for example water, and subsequently extracting the information therefrom.

In a typical procedure as practiced prior to the present invention, the sample is placed in a strong inhomogeneous magnetic field which aligns the nuclear gyroscopes, such as the protons or hydrogen nuclei in water, parallel to the field, in the familiar manner in which a mechanical gyroscope aligns itself upright under the influence of gravity. In this process the directions of various nuclear magnetic moments may be either with or against the main field direction, as determined largely by chance. In the aggregate, however, while a number of moments directed against the field balances out an equal number directed with it, there remains a preponderant overage or effective resultant of moments in one direction.

Information is stored by means of one or more torsional radio-frequency magnetic impulses applied to the sample via a coil directed at right angles to the direction of the main field. The frequency of the radio-frequency field is tuned to the sample's average Larmor precessional frequency, as hereinafter defined. These pulses couple with groups of the phase-coincident magnetic moments, tipping the latter, together with their associated spinning nuclei, out of alignment with the main field. In the case of a single information pulse, the optimum tipping angle is 90 degrees, so that the maximum resultant moment effect, carried around by the rotating R. F. field in the manner of a synchronous motor, revolves in the XY plane perpendicular to the Z-axis or main-field direction, that is in or closely adjacent the axial plane of the R. F. coil. In the case of multiple information pulses or of single pulses causing tipping of other than 90 degrees, however, it will also be evident that all tipped moments have components rotating in the XY plane.

During an information pulse the moments tipped thereby, being resonantly coupled to the revolving R. F. field, are carried around together so that they retain substantially their initial phase coincidence. As an information pulse terminates, removing the driving R. F. field, the restoring urge of the main magnetic field causes each tilted spinning nucleus to start gyroscopic precession about the Z-axis at a characteristic frequency (termed Larmor frequency) which is the product of its gyromagnetic ratio and the field strength affecting that particular nucleus. Since the field is not homogeneous, various nuclei acquire differing Larmor frequencies, so that their magnetic moments gradually draw out of phase with each other and distribute themselves around the rotational Z axis so as to lose any cooperative inductive effect on the R. F. coil.

A powerful torsional R. F. "recollection" pulse is next applied which has the effect of "flipping" the rotational plane of the precessing moments through a large angle, preferably 180 degrees in the simplest case, so that at the termination of the recollection pulse the various moments which formerly were phase divergent become phase convergent, drawing together at the same relative rates at which they formerly were drawing apart. Consequently, after a period of time the moments return to mutual phase coincidence, reinforcing each other by constructive interference to induce a signal in the R. F. coil. This signal, which in each case comprises an "echo" of the corresponding previously applied information pulse, is detected, amplified, exhibited on an oscilloscope, or employed in any other desired manner.

In the above-outlined prior practice of spin-echo technique, which has been most successfully applied to liquids such as water and certain mineral oils, both the initial polarization of the gyromagnetic bodies and their excitation to Larmor precession are dependent on the maintenance of an externally supplied unidirectional magnetic field of great strength, a typical process requiring a field strength of the order of 7000 gausses. To supply such a powerful field has called for either a permanent magnet of several hundred pounds weight or an equivalent D. C. electromagnet.

A principal object of the present invention is to provide spin-echo technique in which the strong external unidirectional field, and consequently the above mentioned large magnets, are eliminated.

In pursuit of this object, a further object is to utilize the natural internal fields existing in crystalline materials to provide both the alignment of nuclei or gyromagnetic resonators and the subsequent excitation thereof to Larmor precession.

A further object is to provide spin echo technique of the above nature including re-orientation of the initially aligned resonators alternatively by resonance coupling between a driving R. F. magnetic field and the magnetic moments of the resonators, or by coupling to the quadrupole moment of the resonator applied pulses of electric field gradient oscillations, produced by deformation of the crystalline structure with externally applied electric fields.

A further object is to provide technique of the above nature adapted to obtain an array, or time sequence distribution of spontaneous induction from crystals (denoted by spin echoes), which in intensity, shape and time can be uniquely related to a sequence of electromagnetic or oscillatory electric field gradient signals previously applied to the crystal.

A further object is to provide technique of the above nature involving the application of small external inhomogeneous magnetic influences of non-resonant nature for extending the frequency response and accuracy of resolution in the production of spin echo signals.

A related further object is to provide technique for extending arbitrarily the phase memory of Larmor precession in the crystalline field whereby production of the spin echo signals may be delayed, or conversely, for arbitrarily erasing the phase memory.

Another object is to provide means to carry out the above noted technique to the best advantage.

Further related objects and advantages of the invention will become evident during the course of the following description in connection with the accompanying drawings, in which:

Figure 1 is a semi-block diagram illustrative of means to carry out spin echo technique as practiced prior to the present invention;

Figure 2 illustrates diagrammatically a typical new electrical arrangement for carrying out the present invention;

Figure 3 similarly illustrates a further extension of the apparatus of Figure 2;

Figure 4 is representative of oppositely orientated gyromagnetic bodies in the internal field gradient of a crystalline substance;

Figure 5 is a composite diagram illustrating successive conditions and relationships among nuclear moments throughout the successive steps of spin echo technique according to the present invention;

Figure 6 is a time diagram referring to the steps of Figure 5;

Figure 7 illustrates the slow precession of the entire crystalline gyromagnetic system under the influence of a weak magnetic control field;

Figures 8 and 9 illustrate by analogy the reason for extension of phase memory of Larmor precession by application of the control field, and Figures 10 and 11 illustrate the improved spin echo result produced by extending the Larmor precessional phase memory.

Prior to the detailed explanation of the present invention it is necessary to point out that the phenomena basically involved are not simple classical relationships between a few tangible objects, but rather are the manifestations of a vast number of infinitesimal bodies and forces in the complex interrelationships of quantum physics. Rigorous quantum analysis herein would obviously be unduly repetitious in view of my previously mentioned publications, and accordingly not appropriate to the present description, particularly since by their nature various quantum phenomena involved cannot per se be classically depicted. Instead, for purposes of clarity in explanation, various arbitrary bodies and relationships are depicted diagrammatically as representative of the composite resultants which interact to produce the macroscopic objective. For example, the two nuclei shown in Figure 4 will be understood as representing countless pairs of similar bodies existing in the sample. It should further be understood, also, that while for purposes of simplicity the explanation is directed to spinning nuclei, the described phenomena may also be referred to spinning electrons and all other types of gyromagnetic resonators.

As previously noted, the practice of spin echo technique with suitable liquids, such as water, requires the presence throughout the sample of a large polarizing magnetic field. Figure 1 shows a typical set-up for practicing this technique of the prior art, the field being furnished by a large permanent magnet 20. The sample 21 of chemical substance is held in a radio-frequency coil 22 disposed between the pole-faces of the magnet 20, the coil having its axis at right angles to the direction of the magnet's field.

The R. F. coil 22 forms one leg of a balancing bridge network 23, a second similar coil 24 forming the other leg. The numeral 25 indicates an oscillator or exciter comprising a source of radio-frequency, which latter is delivered via a power amplifier 26 and a tuning network 27 to the bridge network 23. A pulse source or timer 28 originates the previously mentioned information and recollection pulses, first starting the exciter 25 and then triggering the power amplifier 26 to produce the desired duration of R. F. pulse. The timer 28 also furnishes horizontal sweep impulses to an oscilloscope 29. Since the internal structures and operation of such suitable timers, exciters, amplifiers, etc., are well known in the electronics art, no further description is necessary herein.

Vertical deflector plate impulses are furnished to the oscilloscope 29 by a receiver or detector-amplifier 30 having its input conductor 31 centrally connected into the bridge network. This central connection, between the coils 22 and 24, prevents large amounts of R. F. power from entering the receiver 30 during the information and recollection pulses, this being the purpose of the bridge network 23. After the termination of these pulses, that is, in the absence of supplied resonant R. F. power, echo pulses induced only in the single leg coil 22 are transmitted to the receiver 30 and produce their trace on the oscilloscope 29. Thus it will be seen that the bridge network permits the same R. F. coil 22 to be used for applying impulses to the sample 21 and for extracting echoes therefrom. As a variant of this arrangement, a separate detector coil may be provided, this second coil having its axis at right angles to that of coil 22 and being connected directly to the receiver, thus eliminating the requirement for the balancing network in some applications.

When in the practice of the present invention it is desired to use R. F. magnetic information and recollection pulses, these pulses may conveniently be provided by the same general combination of elements as shown in Fig. 1. However, the new technique employing crystal instead of liquid substances involves radical differences in the method and means of dealing directly with the sample itself, typical apparatus for this purpose being shown in Fig. 2.

The most prominent and most obviously advantageous difference exhibited by the new method lies in the elimination of the huge permanent magnet 20 of Fig. 1 or its equally expensive and cumbersome electromagnetic equivalent. This improvement of course is due to the absence of any requirement for a powerful exterior polarizing field, as previously noted. In fact, the crystal sample 32 is subjected to no significant exterior polarizing field whatever. Instead, it is supplied with a weak nonpolarizing control field ranging, for example, from 1 to 20 gausses, in obvious contrast to the 7,000 gauss polarizing field typically required in the prior technique. The purposes and operation of the small control field will be hereinafter explained at length.

Referring to Fig. 2, the control field may be conveniently provided by a pair of coreless D. C. magnet coils 33 and 34 arranged coaxially on opposite sides of the sample 32 and wound in unidirectional series. A suitable source of direct current 35, illustrated as a battery but which of course may be of any equivalent type such as a rectifier unit, is connected on one side to the 33—34 coil combination. The other side of source 35 is connected through a rheostat 36 to a suitable gate or valving unit 37 controllable by the timer 28. Return connection from the gate 37 is made through a switch 38 to the 33—34 coil combination. The switch 38 is of the triple-throw type as shown, providing an alternative right hand position cutting out the gate unit 37 and connecting the coils directly through the rheostat 36 to the source 35, and a central position for opening the coil circuit entirely if desired.

In the arrangement shown in Fig. 3 the set-up and connections of the coils 33 and 34 are substantially as shown in Fig. 2, but a second pair of small coils 39 and 40 is provided in addition in order to supply an inhomogeneous type of control influence as hereinafter explained. For this purpose the coils 39 and 40 may be disposed adjacent or within the coils 33 and 34 with their axes inclined as shown. Current for the coils 39 and 40 is supplied by the source 35 via a second rheostat 41, either under control of a second gate unit 42 similar to unit 37 or through direct connection by means of a second triple-throw switch 43 in the same manner as described in the case of coils 33 and 34. By the arrangement shown, it will be evident that the two sets of coils may be regulated, pulsed, steadily energized or de-energized independently of each other or in any desired combination.

There exists in each of certain types of crystals, for example sodium chlorate ($NaClO_3$), an electric field gradient $q$ which serves to align the chlorine nuclear bodies, if they have the property of comprising an unsymmetric charge distribution or quadrupole moment A. Such a field gradient in sodium chlorate is indicated in Fig. 4, being taken as axially symmetric about the molecular bond (designated the Z-axis) joining sodium to chlorine. Fig. 4 also illustrates a spinning nucleus including the quadrupole moment A or shortened cigar-shaped charge distribution, the axis of spin comprising the long axis of the charge. It will be evident that so long as such a nucleus is orientated in the direction of the Z-axis, the electric field $E_A$ across the top of the charge will be balanced by the equal field $E_B$ across the bottom thereof, so that the nucleus remains stabilized in the crystal, i. e., in its "relaxed" position. However, if the nucleus is tipped from the Z-axis orientation, the charge will be subjected to unbalanced lateral field gradient forces tending to reverse the tipping motion. Under such conditions, since the nucleus has angular momentum of spin and hence comprises a gyroscope, it precesses in the electric field in a manner analogous to the previously described precession of gyromagnetic nuclei in a strong magnetic field. It is important to point out here, however, that in addition to its characteristics of spin and quadrupole moment, the nucleus also possesses the property of magnetic moment $\mu$, orientated along its axis in one direction or the other dependent on the direction of spin. While initial principal nuclear alignment and subsequent Larmor precession are achieved by the electric field gradient, the magnetic moments are utilized for coupling to applied R. F. magnetic signal fields and for eventual induction of echo pulses, as hereinafter set forth.

In the initial alignment of spinning nuclei in the electric field gradient $q$ of the typical $NaClO_3$ crystal under consideration, assuming $q$ to be axially symmetric along the molecular bond or Z-axis, it can be shown according to the Boltzman law in the case of spin of $I=3/2$ for chlorine, that $q$ couples with Q to establish two equal and opposite macroscopic moment vectors which oppose each other along the Z-axis. The symbol Q represents the average value of the squares of the distances from the center of a nucleus to all points in the nucleus, each point being weighted by the density of charge at that point, Q thus comprising a measure of the effective deviation of the charge A from the spherical. The reason for the equal and opposite alignment of the magnetic moment vectors, illustrated in Fig. 4, is that there is equal probability for the cigar-shaped nuclear charge distributions A and $A_1$ to align in either direction with respect to the crystalline electric field gradient $q$. Since either direction is equally probable, the magnetic moments which are carried along with the nuclei are also aligned, giving a preponderant macroscopic moment $+\overline{M_0}$ in the $+Z$ direction and a preponderant moment $-\overline{M_0}$ in the $-Z$ direction. Thus in its state of thermal equilibrium, there exist in the internal electric field of the crystal two families of oppositely aligned spinning nuclei, both equally "vulnerable" to the onset of an information pulse, in contrast to the single unidirectional set of "vulnerable" nuclei existing in the strong polarizing magnetic fields of the prior art.

The effects resulting in spin-echoes may be followed in their successive relation by reference to Fig. 5, in which sub-figures B, C, D, E and F represent plan views of the X—Y plane of rotational reference, and $B_1$ and $C_1$ represent horizontal views taken along the direction of the X-axis in correspondence with sub-figures B and C respectively.

Referring first to Figs. B and $B_1$, which represent the initial or equilibrium condition of the sample, the equal and opposite moment vectors $\pm M_0$ are shown aligned along the Z-axis, as set forth above. As previously noted, it will be understood that these vectors represent not single nuclear moments but the resultants of vast numbers of such moments. However, for simplicity in illustration, $+M_0$ will be assumed as composed of two moments $M_a$, $M_b$ aligned in the Z direction in differing values of the natural crystalline field which may include the electric field gradient $q$ and local di-pole magnetic fields, and that $-M_0$ similarly comprises moments $M_c$ and $M_d$. Since these moments are all taken as aligned along the Z-axis (Fig. $5B_1$), they initially have no components in the X-Y plane, and therefore appear in Fig. 5B merely as a central point.

An R. F. magnetic signal $P_1$ (Fig. 6) is applied by the coil 22 surrounding the sample. This coil is tuned to the Larmor frequency $\omega = \omega'_0$, where $\omega'_0$ is the average angular Larmor frequency of nuclear moments in the sample. The R. F. impulse is applied for $t_\omega$ seconds (Fig. 6) during which time approximately $\omega'_0 t_\omega$ Larmor oscillations take place. This signal field is composed of two oppositely rotating circularly polarized field components $H_1$ which combine to provide the alternating field $2H_1$ along the axis of the coil, i. e., the X-axis. One of these circularly polarized field components $H_1$ of the applied R. F. field $H_x = 2H_1 \cos \omega t$ couples to the moment $+M_0$, while the second similarly couples to the oppositely spinning moment $-M_0$, applying torques thereto which tip them through net angles $\theta$, Fig. $C_1$, herein taken for illustration as 90° and hence extending to the XY plane. Since the moments were equal and opposite and the rotating R. F. field components are also equal and opposite in rotation, the moments reach the XY plane and are carried around therein in counter-rotational symmetry with respect to the X-axis, as shown in Fig. 5C. So long as the R. F. field persists, the two composite moments are carried around at the speed of the field, in a manner somewhat analogous to two rotors revolving in the field of a single phase synchronous motor after having been started in opposite directions therein. So long as the symmetry is retained with respect to the X-axis, it will be evident that while the two counter-rotating families of moments may have additive components in the X-direction, their components in the Y-direction are equal and opposite and hence cancel each other.

At the termination of the information pulse $P_1$ the moments $M_a$ and $M_b$ making up the composite moment $+M_0$, having been revolved at the same speed of the R. F. field, have remained in phase coincidence with each other as shown in Fig. 5C, the same condition of phase coincidence also existing between $M_c$ and $M_d$ making up the moment $-M_0$. However, as soon as the information pulse ceases and the driving R. F. field is thus removed, each of the moments begins precession at its own Larmor frequency in the electric field gradient $q$. In the present case of precession in an electric field, the Larmor frequency is given by $$\omega = \frac{egQ}{2h}$$

where $e$ is the charge of the electron, Q is as previously defined, and $h$ is Planck's constant ($6.6 \times 10^{-27}$) divided by $2\pi$.

Since as previously noted, $M_a$ and $M_b$ are subject to differing values of crystalline field, it will be evident from the above equation that these two members of the $+M_0$ "family" acquire differing Larmor precessional frequencies, assumed for representative illustration as respectively greater than and less than the average Larmor frequency $\omega'_0$ of the group. Accordingly, while both continue to precess in the same direction, their differing frequencies cause them to draw out of angular coincidence, in other words to become phase divergent as illustrated in Fig. 5D. The same cause produces the same phase divergence between moments $M_c$ and $M_d$.

At the beginning of their phase divergence, as noted, moments $M_a$ and $M_b$ naturally were in phase, together with a large number of similar other members of the $+M_0$ family, understood as being present but omitted from the diagram for purposes of clarity. Consequently, the moments were in mutually reenforcing position. At the same time the same condition existed in the $-M_0$ family. Thus concentrated, both families were in condition to induce a signal in the coil 22 which as also previously pointed out, was axially aligned in the axis of rotational symmetry between the two families, namely, the X-axis. The result is that the end of the information pulse $P_1$ is marked by a "tail" signal shown at 44, Fig. 6, induced jointly by the composite moments $+M_0$ and $-M_0$, and which dies out as the members of each family diverge from phase coincidence as shown in Fig. 5D.

As the members of each $+M_0$ and $-M_0$ groups of moments continue their divergence, they distribute themselves around their Z-axis so as to cancel each other so far as any inductive effect on the coil 22 is concerned, but they do preserve definite phase relations among themselves so long as their relative Larmor precessional frequencies remain substantially undisturbed, i. e., so long as they preserve their "phase memory." Considering at the present explanatory stage that the process is timed well within the phase memory of the nuclei concerned, it may be assumed that at the end of a time T the representative moments $M_a$ and $M_b$ have diverged through an agle $\Phi$ to the relative positions shown in Fig. 5D, and that moments $M_c$ and $M_d$ have acquired a similar divergence. At this point a radio-frequency recollection pulse $P_r$, Fig.

6, is applied by the coil 22, this pulse being of sufficient power and duration to tip all the moments through an angle taken herein as 180 degrees. The effect is to flip or "pancake" the respective planes of rotation of the $+M_0$ and $-M_0$ moments about the X-axis into the mirror position shown in Fig. 5E, still retaining the separation angles $\Phi$. However, since the various moments still rotate in their respective initial directions, it will be evident that in each group the moments of faster Larmor precession which formerly led and drew away from the slower moments, are now behind the latter in the general rotation and accordingly start to overtake them at the same rate that they formerly separated. Thus the effect of the recollection pulse is to change the condition within each group of moments from phase-divergence to phase-convergence.

Still assuming the retention of Larmor precessional phase memory, it will be evident that at the end of a second time period T after termination of the recollection pulse, Fig. 6, the moments of each group will have converged to their initial coincidence as $+M_0$ and $-M_0$, Fig. 5F. As each set of moments approaches coincidence it comes into constructive or mutually reenforcing interference, and due to their previously described symmetric relation respecting the X-axis, $+M_0$ and $-M_0$ cooperately induce a signal in the coil 22, which signal comprises an "echo" K of the previously entered information pulse $P_1$, Fig. 6. By the means previously described the echo signal may be detected, amplified, exhibited on the oscilloscope for study, or utilized in any other manner desired.

It will be seen that the above explanation approximates in analogy the behavior of spin vectors in the strong magnetic field of the prior art, except that by elimination of the strong magnetic field and utilization of the inherent electric field to effect initial alignment and subsequent precession, the present process takes advantage of two counter-rotating sets of gyromagnetic resonators instead of the single set dictated by the purely magnetic process. The description has dealt with production of an echo from a single information pulse, but since the use of multiple information pulses to produce multiple echoes similarly follows in analogy the production thereof in the the magnetic method fully set forth in my previously mentioned publications, further description in this respect would be unduly repetitious herein. Instead, it is necessary to point out at this time the manner in which certain otherwise disadvantageous characteristics of crystals are overcome in the present invention, in order to attain the latter's particularly advantageous results.

The time that the induction signal due to a classically precessing $M_0$ vector (or to a cooperative $+M_0$ and $-M_0$ pair of vectors as in the present case) can persist is also the time for which constituent nuclear spins precess in phase before damping effects, due to the lattice and coupling with neighboring spins, become appreciable. This coherence time is given by $T_2$, often referred to as the "transverse relaxation time." Another relaxation time of importance and which determines in part the value of $T_2$, is the longitudinal or thermal relaxation $T_1$, the time in which a precessing spin remains in the excited state regardless of its phase, in other words the time necessary for the spinning nuclei to achieve alignment after being disturbed therefrom. In liquids both these relaxation times may vary from fractions of milliseconds to several seconds. In solids $T_1$ can be as long, but generally is shorter; however $T_2$ is shorter, ranging from microseconds to milliseconds. Since the extent of $T_2$ obviously determines the Larmor precessional phase memory of the system, it will be seen that the extremely short $T_2$ naturally existing in crystals would set a severe limitation on their usefulness in spin echo technique. In the present invention this limitation is substantially overcome as follows:

The short normal $T_2$ in crystalline bodies is due principally to spin-spin flip or coupling between adjacent nuclei which interferes with and rapidly breaks up the individual phase progressions. The spin-spin flip or coupling is at maximum between bodies having mutual resonance of spin, i. e., whose natural spin frequencies exactly or very closely coincide. In crystals such as the example of sodium chlorate under consideration, this close coincidence of nuclear spin frequencies exists to a marked degree in the normal state, resulting in very short available Larmor precessional phase memory, as noted. To eliminate this condition, the present technique makes use of the phenomenon known as Zeeman separation, first observed spectroscopically as a striation, in the presence of a magnetic field, of spectral lines which normally appeared to be single.

Briefly outlined, the Zeeman effect consists in giving to each spinning nucleus a number of differing possible frequencies at which it may spin, instead of a normally set single frequency. In the case, therefore, of similar adjacent nuclei so affected, the probability of their both having the same spin frequency, and hence coupling, is greatly reduced. This point may be simply illustrated by analogy in Figs. 8 and 9. If, as in Fig. 8, two objects 45 and 46 approach each other in a single path 47 or in paths so close together as to be practically coincident, a collision between the two objects is obviously inevitable. However, if as in Figure 9, each object is permitted an unguided choice of a number of separated paths 48, 49, 50 and 51, the probability of both objects choosing the same path and thus colliding is rendered quite small, decreasing ripidly as the number or separation of paths is increased.

In the present technique, referring to Fig. 2, Zeeman separation in the spinning nuclei of the sample may be effected by subjecting the sample to a small homogeneous magnetic field $H_0$ produced by the D. C. coils 33 and 34. Figures 10 and 11 illustrate the effect of the control or Zeeman separation field. In Fig. 10, wherein this field is not applied, the loss of phase memory is so rapid that only vestigial echoes K are produced. With the separation field $H_0$ applied, however, the phase memory is greatly extended so that distinct echoes K corresponding to information pulses $P_1$ may be produced, the useful time period of the cycle also being extended in consequence of the increased phase memory. Thus by applying the small homogeneous field $H_0$ in varying strengths, the degree of Zeeman separation in the spinning gyromagnetic resonators and hence the phase memory may be varied throughout a useful range, and conversely, the phase memory may be effectively erased at any time by interruption of the separation field.

A second useful function may be produced by the small homogeneous field $H_0$, namely, that of permitting the echo signals to be induced, if desired, in a coil other than the coil 22 which delivers the information and recollection pulses, this effect being illustrated in Fig. 7.

The counter-directional precession of the two families of nuclear resonators, as previously explained, is due to the strong internal fields of the crystal itself. However, the small magnetic field $H_0$, while in itself too weak to effect a general unidirectional precession such as is produced in the powerful magnetic field of the prior art, may be used to influence the precessions already set up. In other words, this small field, being unidirectional slightly augments or speeds up the precession of one set of spinning nuclei while opposing and correspondingly slowing the precession of the other set. The composite effect is a relatively slow general precession of the entire system of moments which swings the axis of symmetry $A_s$ along which the $+M_0$ and $-M_0$ moments have additive components, out of registry with the coil 22 and revolves it in the X—Y plane as shown in Fig. 7. The speed of rotation is given by approximately $\Omega = \gamma H_0$, having the order of magnitude of kilocycles. By proper adjustment of $H_0$ it is possible therefore to bring the $A_s$ axis alternately into registry either with the coil 22 or with the second coil 52 arranged at right angles to 22, i. e., in the Y-axis, thus permitting nuclear signals to be detected selectively by either coil. The advantages in increased flexibility of application are obvious.

The foregoing explanation has dealt with effects produced by the small field $H_0$ when the latter is made homogeneous. A further useful result is obtained by periodically adjusting $H_0$ so as to render the latter inhomogeneous over the sample, for example, by use of the coils 39 and 40, Fig. 3. In this case the inhomogeneity of $H_0$ augments the inhomogeneity already existing in the internal crystalline fields, so that the spectrum of Larmor precessional frequencies is broadened. The widening of the available Larmor frequency band permits more effective use of narrow and particularly of multiple information pulses, with correspondingly improved resolutional fidelity in the resulting echo signals.

It will be evident from the foregoing that by application of homogeneous and inhomogeneous fields $H_0$, either separately or pulsed in various combinations, a wide range of operational conditions is made available for most advantageous application of the technique. The rheostats 36 and 41, Fig. 3, afford manual means to adjust the strengths of the $H_0$ fields, and any desired combinational pulsing obviously may be provided by the timer 28. As an example of combinational use of homogeneous and inhomogeneous $H_0$ components, both may be applied during the information pulses and during echo formation, but the inhomogeneous $H_0$ may be cut out for the duration of the recollection pulse $P_r$. This combination provides for a contraction of the Larmor bandwidth during the recollection pulse, which contraction results in reduced requirement for R. F. power for the reasons set forth in co-pending application Serial No. 384,741, now Patent Number 2,700,147, by G. L. Tucker. Other combinations, all embodying the action of weak non-polarizing $H_0$ fields on Larmor precession set up in the natural fields in crystals, may be employed in production of such phenomena as "stimulated echoes," which effects have been explained at length in the previously mentioned article in Physical Review and therefore need not be further set forth herein.

The foregoing description has set forth the present technique as effecting initial nuclear polarization and subsequent Larmor precession by means of the crystal's own inherent electric field. Certain other crystalline substances, however, may provide strong internal magnetic fields which produce initial alignment and subsequent precession by coupling to the magnetic moments of the gyromagnetic resonators, instead of the quadrupole charge coupling utilized in the case of the electric fields. The practice of carrying out the technique and the effects are substantially the same, except that in the purely magnetic case the precession producing the echoes is unidirectional, as the internal magnetic fields are unidirectional. The use of small non-polarizing fields to control precessional phase memory by Zeeman separation and to widen the Larmor frequency bands apply in the same manner whether the particular crystals in use provide their own magnetic or electric polarizing fields.

In either of the above cases, the information and recollection pulses are normally effected by the R. F. magnetic field coupling to the magnetic moments of the resonators, whether the polarizing and Larmor precessional urge be electric or magnetic. With crystals providing the electric polarizing fields, however, instead of the R. F. magnetic coupling to orient the resonators away from their aligned position, the tipping may be effected by coupling to the quadrupole moments a pulse of electric field gradient oscillations produced by deformation of the crystalline structure with externally applied electric fields. This may be brought about by placing the crystal between the plates of a condenser adapted to impose a strong homogeneous field throughout the crystal, and oscillating the electric field at a suitable R. F. frequency. If this field E is made to oscillate at a frequency which can be the same as or twice the mean Larmor frequency of the nuclei in the sample, periodic deformation of the crystalline ions brings about a periodic variation in the X—Y component of the electric field gradient $q$ present at the nuclear quadrupole moment A, coupling to and tipping the latter. There results an effective precession of the nucleus about this rotating field gradient, and free precession results, following removal of the external R. F. electric field, in the same manner as if the previously described magnetic R. F. field had been applied. In another modification, the crystal may be vibrated mechanically at the proper R. F. frequency.

As a further variation in the technique, the applied R. F. influence, instead of being pulsed in amplitude may be maintained constant in amplitude and pulsed in frequency, so as to be at the resonant frequency of the sample during a pulse and off resonance at other times. This type of operation makes use of the fact that a radio frequency field which is not in resonance with gyromagnetic bodies has very little effect on the motion of such bodies in their polarizing field, and may be employed to bring out one of the great advantages of the present invention for application to computing machines and the like, as follows:

Various types of crystals have various resonant frequencies which, while differing widely as between types, are substantially constant for each individual type. Therefore, if a number of crystals of differing set resonant frequencies are employed as memory devices, entries may be selectively made in or extracted from such crystals in any desired combination, by selective application thereto of the proper R. F. frequency pulses which will automatically actuate the resonant storage devices and ignore the others. As stated, the advantages of the present invention in this respect, as well as in elimination of necessity for heavy exterior magnetic fields, will be particularly obvious in connection with such applications as computers requiring large numbers of memory units.

The foregoing description has made use of specific illustrations of apparatus and procedures in order to make clear the nature and advantages of the present improved spin echo technique, but it will be understood that these comprise typical examples not to be regarded as limits. For instance, the direction of the control field $H_0$ magnets 33 and 34 with respect to the sample 32 may be varied as indicated in dot and dash lines, Fig. 2, and the sample may be turned to align its crystalline axis in position to afford most advantageous results. The direction and location of the "dehomogenizing" coils 39 and 40 may be arranged to produce various directions and distributions of $H_0$ inhomogeneity in the sample. Similarly, the oscilloscope 29 may be accompanied by or replaced by any suitable type of transmitting device for relaying the echo pulses to other destinations determined by the desired use. In other words, while the invention has been set forth in preferred form, it is not limited to the exact structures and procedures illustrated, as various changes and modifications obviously can be made without departing from the scope of the appended claims.

What is claimed is:

1. That method of practicing spin-echo technique with a crystalline material having inhomogeneous internal polarizing fields normally aligning gyromagnetic resonators therein, which includes the steps of applying a torsional information pulse of resonant frequency to said material to displace said resonators angularly from said alignment, whereby upon termination of said information pulse said inhomogeneous internal fields may excite said resonators to phase-divergent Larmor precession in mutual phase-memory relation, the average frequency of said precession substantially corresponding to said resonant frequency, establishing Zeeman separation of spin frequencies among said resonators to extend the duration of said phase-memory relation, applying a resonant torsional recollection pulse to said material to change said precessional phase divergence to phase convergence, whereby the magnetic moments of said resonators may converge to produce an echo pulse by constructive interference, and detecting said echo pulse.

2. A method according to claim 1 including the step of applying an inhomogeneous non-polarizing magnetic field to said material for widening the frequency band of said Larmor precession.

3. In spin-echo technique, that method of effecting an extended Larmor precessional phase memory period among gyromagnetic resonators in crystals having internal polarizing fields, which includes the steps of establishing Zeeman separation of spin frequencies among said resonators, and exciting said resonators to differential Larmor precession in said fields.

4. A method according to claim 3 wherein said Zeeman separation step includes applying a unidirectional non-polarizing magnetic field to said sample.

5. That method of practicing spin-echo technique with gyromagnetic resonators in crystals having inhomogeneous internal electric fields, said resonators comprising gyromagnetic nuclei having quadrupole electric charges and being normally aligned by said fields in two oppositely directed groups of counter-spinning nuclei, which includes the steps of establishing substantial Zeeman separation of spin frequencies among said nuclei, applying information pulses of resonant radio-frequency oscillations to said crystals to disalign said nuclei whereby said spinning nuclei of said two groups may be excited to counter-rotational Larmor precession in inter-group symmetry by interaction between said quadrupole charges and said internal electric fields, the Larmor precessional frequencies in each of said groups differing throughout a band-width having an average frequency comprising said resonant frequency, whereby the magnetic moments of said nuclei in each of said groups may be rendered phase-divergent, applying a recollection pulse of resonant radio-frequency oscillations to said crystals to change said nuclear phase divergence to phase-convergence whereby constructive interference by said magnetic moments in each of said nuclear groups may produce echo pulses related to said information pulses, and detecting said echo pulses.

6. A method according to claim 5 in which said Zeeman separation establishing step includes applying a non-polarizing magnetic field to said crystals, and including the step of adjusting the strength of said non-polarizing field for varying the extent of said Zeeman separation, whereby the phase-memory of said Larmor precession among said nuclei may be controlled.

7. A method according to claim 5 wherein said Zeeman separation establishing step includes application of a unidirectional non-polarizing field to said crystals, and including the steps of adjusting the strength and direction of said non-polarizing field for controlling the orientation of the axis of said rotational symmetry between said counter-precessing groups of nuclei.

8. In spin echo technique with a crystalline substance having internal polarizing fields and gyromagnetic resonators normally polarized thereby, that method of controlling Larmor precession of said resonators in said fields which includes the steps of applying a unidirectional non-polarizing field throughout said substance, whereby Zeeman separation of spin frequencies may be established among said resonators for inhibiting spin-spin coupling of the same and thereby extending Larmor precessional phase memory of said resonators, and pulsing said non-polarizing field in amplitude for controlling said extension of said phase memory.

9. A method according to claim 8 including the step of pulsing said non-polarizing field in inhomogeneity for varying the frequency band-width of said Larmor precession.

10. A method according to claim 8 which includes the step of interrupting said non-polarizing field for erasing said phase memory.

11. In spin echo apparatus, in combination, a sample of crystalline material having an internal polarizing field and gyromagnetic resonators normally polarized therein, resonant means to excite said resonators to differential Larmor precession in said internal field, and non-polarizing means to establish Zeeman separation of spin frequencies among said resonators, whereby phase memory of said differential Larmor precession may be extended.

12. The combination claimed in claim 11 including adjustable means to establish an auxiliary field inhomogeneity in said sample, whereby the frequency bandwidth of said differential Larmor precession may be varied.

13. In spin echo apparatus, in combination, a sample of crystalline substance having internal electric field gradients and two groups of oppositely spinning gyromagnetic resonators including quadrupole electric charges normally polarized in said gradients, resonant signalling means to excite said resonators of one of said groups to differential Larmor precession in said field gradients in one direction and to excite said resonators of said other group to differential Larmor precession in said field gradients in the opposite direction in rotational symmetry with said first group, and means to effect angular shift of the axis of said rotational symmetry.

14. In a memory device, in combination, a sample of material having an internal polarizing field and gyromagnetic resonators normally polarized therein, information-signal entering means to excite said resonators to differential frequency precession in said internal field in mutual phase-memory relation, means to educe an information echo signal from said precessing resonators within the time persistance of said phase memory relation, and means to establish separation of spin-frequencies among said resonators whereby said persistance of said mutual phase memory may be extended.

15. The combination claimed in claim 14 including adjustable means to establish an auxiliary field inhomogeneity in said sample whereby the frequency bandwidth of said differential precession may be controlled.

No reference cited.